No. 692,732. Patented Feb. 4, 1902.
T. W. TALIAFERRO.
TRIMMING TABLE.
(Application filed Aug. 22, 1901.)
(No Model.)
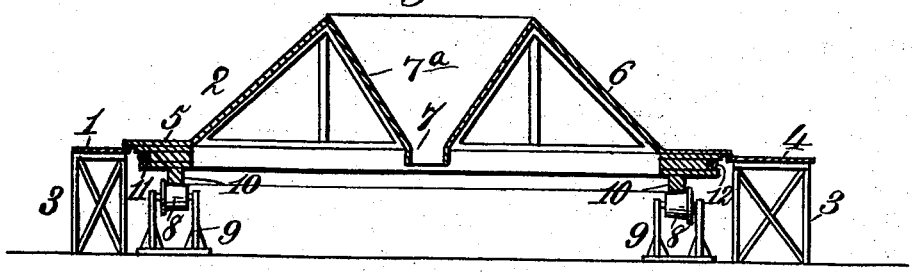
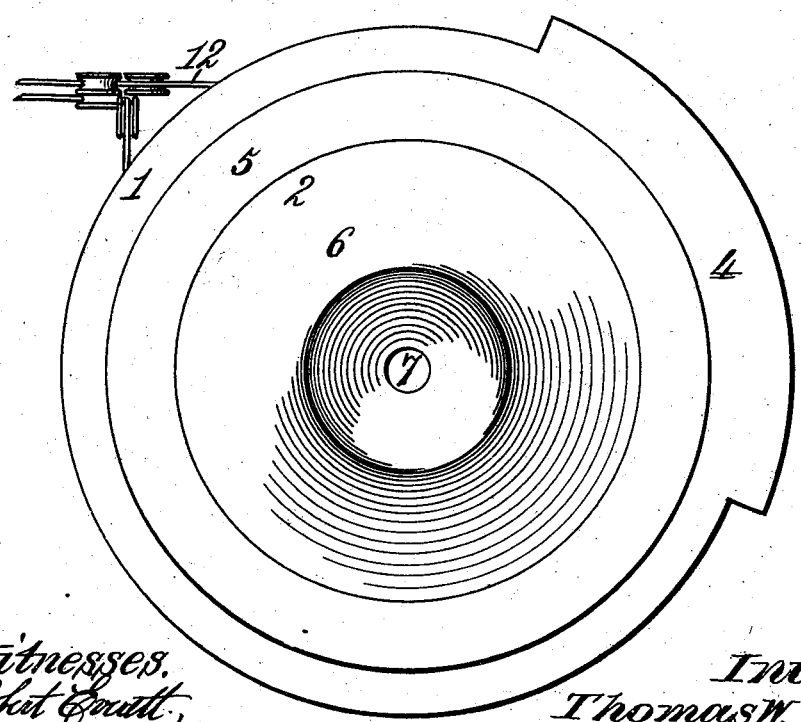
Witnesses
Robert Courtt
W. B. Keeler
Inventor
Thomas W. Taliaferro.
By James L. Norris
Att'y.
THE NORRIS PETERS CO., PHOTO-LITHO., WASHINGTON, D. C.

UNITED STATES PATENT OFFICE.

THOMAS W. TALIAFERRO, OF OMAHA, NEBRASKA.

TRIMMING-TABLE.

SPECIFICATION forming part of Letters Patent No. 692,732, dated February 4, 1902.

Application filed August 22, 1901. Serial No. 72,918. (No model.)

*To all whom it may concern:*

Be it known that I, THOMAS W. TALIAFERRO, a citizen of the United States, residing at Omaha, in the county of Douglas and State of Nebraska, have invented new and useful Improvements in Trimming-Tables, of which the following is a specification.

My invention is designed for the production of an improved trimming-table for hog-carcasses and the like, the object of the same being to provide a table of this kind which will obviate the necessity for trucking the trimmings to be used in the manufacture of sausage-meat from the point where it is cut from the carcass to that where it is further trimmed for sausage-meat.

My improved table comprises in its construction a stationary part and a rotary part, the stationary part being annular and the rotary part being located within the same and provided with a central opening, a flat horizontal outer rim, and an inclined conical wall between said opening and said rim.

The invention also consists in certain features and details of construction and combinations of parts, which will be more fully hereinafter described.

In the drawings forming part of this specification, Figure 1 is a vertical central sectional view of a table constructed according to my invention, and Fig. 2 is a plan view of the same.

As above stated, the table is made up of an annular stationary part 1 and a rotary part 2, located within the same. The part 1 of the table has a flat horizontal upper surface and is designed for the reception of the shoulder or other part of a hog-carcass after it has been cut off by any suitable means. The same is supported upon the uprights or standards 3 and may be wider on one side, as shown at 4, than on the other. The rotary part 2 of the table has a flat horizontal outer rim 5, which is circular in form and overlaps the upper edge of the stationary part 1. It is also provided with an inclined conical wall 6 and with a central opening 7. A funnel-mouthed passage 7ª leads from the inclined wall 6 to the opening 7. The said rotary part is supported upon a series of tapering rollers 8, which are mounted in suitable bearings in the uprights 9 and receive a bearing-ring 10 on the under side of the rim 5. Just above the bearing-ring 10 a belt-groove 11 is formed on the rim 5 of the rotary part 2 for the reception of a driving-belt 12. The said belt may be driven for the purpose of turning the part 2 by any suitable means. I have shown on the under side of the rim 5 a series of parallel annular plates, whose inner edges are in line with each other and the outer edge of the lower of said plates projecting beyond the outer edge of the next plate above it to form the groove 11. This, however, is a mere detail of construction.

In operation the hog-carcass is first cut, chopped, or sawed up to remove the shoulders therefrom, and the shoulders are delivered upon the wide portion 4 of the stationary part 1 of the table. Here said shoulders are trimmed, and the trimmings removed therefrom are delivered upon the rim 5 of the rotary part 2. As said rotary part is constantly turning, said trimmings are conveyed thereby to operators standing along the narrow portion of the stationary part 1 of the table opposite the wide portion. Here said trimmings are further trimmed to remove the fat from the sausage-meat, and the fat may be delivered into one truck and the sausage-meat into another to be conveyed to the proper points of distribution. In lieu of this either the fat or the sausage-meat may be discharged through the central opening 7 in the rotary part 2 of the table upon a truck located beneath said opening. The said opening 7 may, however, be dispensed with altogether; but it is essential that the inclined conical wall 6 be employed for an obvious purpose.

Having now described my invention, what I claim as new, and desire to secure by Letters Patent, is—

1. A trimming-table comprising an annular stationary part and a rotary part within the same, the said rotary part having a central opening therein, an outer rim and an inclined conical wall between said opening and said rim.

2. A trimming-table comprising an annular stationary part and a rotary part within the same, the said rotary part having a central opening therein, an outer rim, an inclined conical wall adjacent to said rim, and a funnel-mouthed passage leading to said opening.

3. A trimming-table comprising an annular stationary part and a rotary part located within the same, the said rotary part having an outer rim, an inclined wall adjacent to said rim, a belt-groove on the under side of said rim and a bearing-ring, a driving-belt fitting within said groove, and a series of rollers on which said ring bears, as and for the purpose set forth.

In testimony whereof I have hereunto set my hand in presence of two subscribing witnesses.

THOMAS W. TALIAFERRO.

Witnesses:
M. L. SEARS,
W. H. CLARKE.